United States Patent Office 3,374,599
Patented Mar. 26, 1968

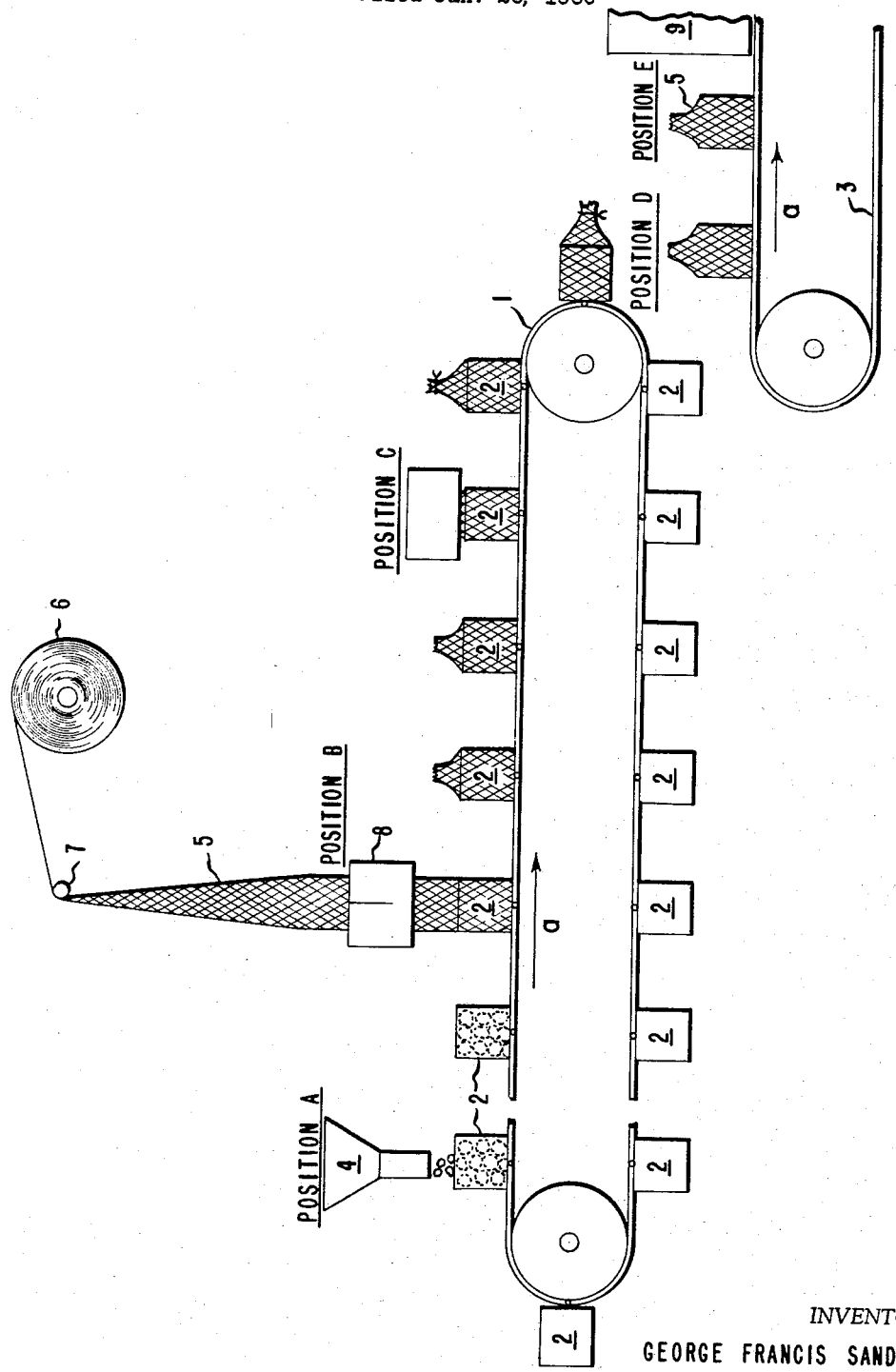

3,374,599
METHOD FOR PACKAGING AND
APPARATUS THEREFOR
George Francis Sanders, Grand Island, N.Y., assignor to
E. I. du Pont de Nemours and Company, Wilmington,
Del., a corporation of Delaware
Filed Jan. 26, 1966, Ser. No. 523,100
6 Claims. (Cl. 53—29)

The present invention relates to a method of packaging bulk products and, more particularly, is directed to improvements in and relating to a method of packaging articles in bags of flexible, seamless, thermoplastic netting material and the apparatus therefor.

It is customary to package articles such as potatoes, onions, tennis balls, and golf balls in individually prepared pre-formed bags of thermoplastic or cellulose material in the form of netting. Such bags are usually pre-sewn or heat-sealed at the bottom thereof or may even employ a pre-formed saddle label for either effecting or constituting the bottom closure thereof. In use, the article(s) to be packaged are pre-weighed or pre-assembled and placed into a pre-formed bag by either a wholly or partially manual operation Thereafter, the top of the container is sealed in a manner similar to that described above for the bottom closure Such methods as the one above described are tedious, slow, time-consuming, and economically wasteful especially when repeated continuously for long periods Accordingly, it is the principal object of the present invention to provide an improved method of packaging bulk materials in tubular containers of thermoplastic netting and apparatus therefor.

According to the present invention there is provided a method of packaging articles in bags formed from a continuous length of tubular netting of thermoplastic material which comprises placing a length of said tubular netting material over a hollow receptacle which contains therewithin the article to be packaged; severing said tubular netting at a point above said receptacle and sealing the end portion of said tubular netting; separating said receptacle from said tubular netting thereby permitting said article to remain in said tubular netting and sealing the open end of said tubular netting thereby to obtain said article in a sealed package of tubular netting of thermoplastic material. In a preferred embodiment of the invention, the sealed package of tubular netting is subjected to heat in order to shrink the netting of thermoplastic material thereby to obtain a firm package.

The nature and advantages of the present invention will be more clearly understood by the following description and the view depicted in the accompanying drawing of a general arrangement or organization of means for practicing the invention.

As seen in the figure, endless belt conveyor 1 is provided with a plurality of hollow receptacles 2 which are each preferably of tubular or cylindrical shape. Another endless belt conveyor 3 is shown located below endless belt conveyor 1 at a vertical distance therefrom equal to approximately twice the height of hollow receptacle 2. Both endless belt conveyors 1 and 3 travel in the direction of arrows a and are driven by any suitable means. The following operations are performed at the approximate positions on the moving endless belt conveyors 1 and 3 indicated in the figure.

*Position A.*—The hollow receptacles 2 are each separately filled manually or automatically in any suitable manner with an article to be packaged such as, for example, a measured quantity of bulk material fed by gravity from a source or supply thereof in a bin 4.

*Position B.*—The filled receptacles are next advanced from position A to position B. At position B, a continuous web of tubular netting material 5 is advanced from supply roll 6 thereof either manually or automatically over guide mechanisms 7 and 8 and placed over the filled receptacle 2 which has been indexed under the tubular netting guide mechanism 8. Any suitable device for advancing the tubular netting may be employed such as disclosed in U.S. Patent No. 2,860,468. The tubular netting is thereafter cut at a point above the top of mandrel 2 either manually or automatically in any suitable manner as by a rotating annular knife incorporated in the structure of guide mechanism 8. A length of tubular netting of approximately 6 inches extending above receptacle 2 is satisfactory. The filled receptacles are next advanced to position C.

*Position C.*—At position C, the netting material 5 extending above the top of hollow mandrel 2 is sealed in any suitable manner as, for example, by use of a saddle-type label applied over the gathered and folded end thereof or staples, tape, or string applied through or around the gathered end of the tubular netting material.

*Position D.*—From position C the receptacle is next advanced to position D at which point the receptacle 2 is separated from the tubular netting and the contents of receptacle 2 are transferred thereinto, since as endless belt conveyor 1 moves to the vicinity of position D the contents of receptacle 2 are transferred into the tubular netting bag and the filled tubular netting bag, having one end sealed, falls by gravity onto endless belt conveyor 3. If desired, the tubular netting bag may be held around receptacle 2 by any suitable means such as movable clamps or jaws preferably mounted on endless belt conveyor 1 and adapted to engage the tubular netting and press it firmly around the outer surface of receptacle 2 as the latter moves from station-to-station on endless belt conveyor 1, especially from position C to and through position D at which point receptacle 2 is inverted, in relation to its attitude at position C, and the contents thereof are urged downwardly against the sealed end of the tubular netting bag. At this point the holding means are disengaged to release the tubular netting bag which then falls with the contents from receptacle 2 therein by gravity onto endless belt conveyor 3.

*Position E.*—The filled tubular netting bag next advances from position D to position E whereat the tubular netting material 5 extending above the contents in the partially formed tubular bag is gathered and sealed in a manner similar to that which was performed at position C. The filled bags may then be heat-shrunk as by passing them through a heated tunnel 9, whenever heat-shrinkable thermoplastic netting material is employed.

Advertising messages may be added to the package in many ways currently known and used in the packaging industry. Such messages may be added to the package by: (1) imprinting them on the saddle label when such a closure device is employed, (2) using an insert label, (3) attaching a tag-type label when making the seal at either end of the tubular netting or, (4) applying a thermoplastic or thermoplastic coated label by heat and pressure to the tubular netting material.

What is claimed is:

1. A method for packaging articles in bags formed from a continuous length of tubular netting of thermoplastic material which comprises placing a length of said tubular netting material over a receptacle which contains therewithin the article to be packaged; severing said tubular netting at a point above said receptacle and sealing the end portion of said tubular netting; separating said receptacle from said tubular netting thereby permitting said article to remain in said tubular netting and sealing the open end of said tubular netting thereby to obtain said article in a sealed package of tubular netting of thermoplastic material.

2. The method of claim 1 wherein the filled receptacle enveloped by the tubular netting bag is inverted prior to being separated from the tubular netting bag thereby permitting said article to fall into the tubular netting bag by gravity.

3. The method of claim 1 wherein said sealed package of tubular netting is heated to heat-shrink the tubular netting thereof.

4. An apparatus for making and filling a bag comprising a first endless belt adapted to be driven intermittently and having a plurality of hollow receptacles adapted to be filled with any desired article secured thereto and extending outwardly therefrom perpendicular to the belt surface, means for filling said hollow receptacles, means for advancing a continuous length of tubular netting over said filled follow receptacles including means for severing said tubular netting at a point above said hollow receptacle, and means for gathering and securing the tubular netting at a point near said severed end thereof, for forming an inverted bag of tubular netting over said hollow receptacle, and a second driven endless belt positioned below said first endless belt in the vertical plane thereof a distance equal to about twice the height of the hollow receptacles secured to said first endless belt, so that the contents of each hollow receptacle are transferred into said bag of tubular netting and the filled tubular netting bag falls by gravity onto said second endless belt as said hollow receptacle is advanced over the end of said first endless belt.

5. The apparatus of claim 4 including means in association with said second endless belt for gathering and securing the open end of said filled tubular netting bag.

6. The apparatus of claim 5 including means for heat-shrinking said filled and closed tubular netting bag.

No references cited.

TRAVIS S. McGEHEE, *Primary Examiner.*

R. L. SPRUILL, *Assistant Examiner.*